March 24, 1970  O. INGRAM  3,502,379
SIDE BEARING HOUSING

Filed Aug. 8, 1968  2 Sheets-Sheet 1

INVENTOR.
O. Miller Ingram

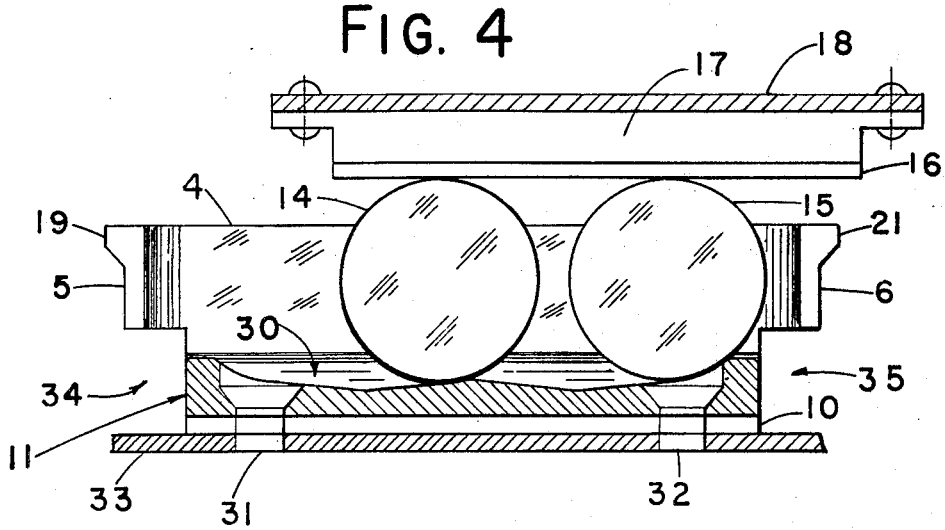
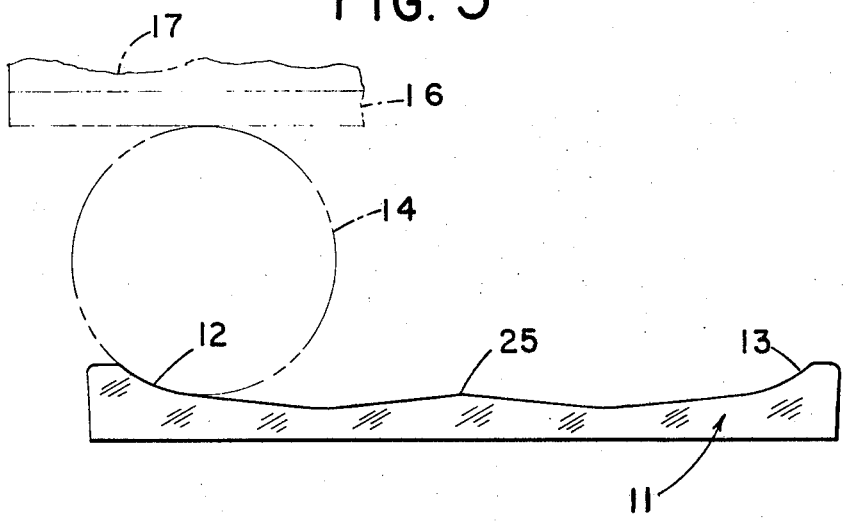
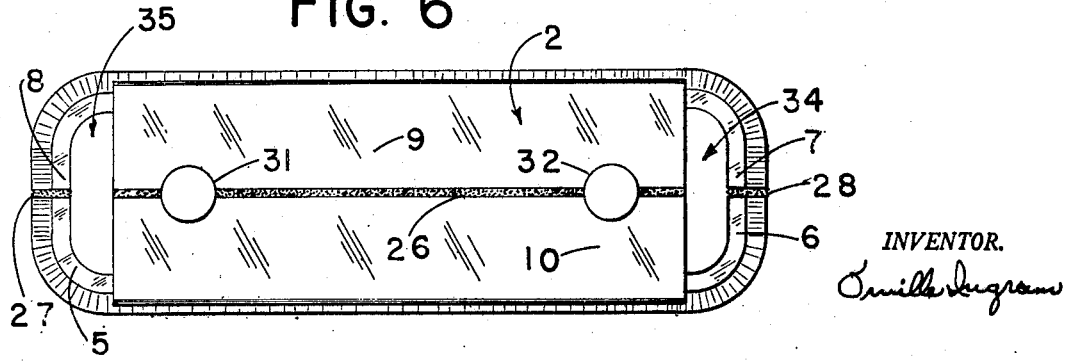

United States Patent Office 3,502,379
Patented Mar. 24, 1970

3,502,379
SIDE BEARING HOUSING
Orville Ingram, Toledo, Ohio, assignor to Midland-Ross Corporation, Cleveland, Ohio, a corporation of Ohio
Filed Aug. 8, 1968, Ser. No. 751,294
Int. Cl. F16c 19/00
U.S. Cl. 308—224     4 Claims

ABSTRACT OF THE DISCLOSURE

A self-clearing, self-centering side bearing structure having a composite housing formed by irregular rolled steel bulb angles united to the underside of a base portion by weld metal, said sides are relieved at the juncture of the sides and the top portion of the base member to avoid binding of the roller within the housing, said base portion at the distal ends are arcuate and conforming to the circumference of the roller forming in cooperation with the body bolster wear plate an effective limiting stop to avoid roller contact with the ends of the housing and damage to the ends under operating conditions.

BACKGROUND OF THE INVENTION

Prior to the development of the roller side bearings four friction blocks were mounted on each end of the truck bolster and between the truck bolster and body bolster wear plates, and with the lighter body car weights and smaller loads placed in the car, the total loads, less than 50 tons, permitted the use of the sliding plate construction. However, when heavier steel cars were developed with higher capacity loads, friction, or sliding blocks became undesirable in that increased friction of the blocks restrained free movements of the trucks under operating conditions. Several types of roller side bearings have been in use for many years and eliminated the undesirable friction caused by the old friction blocks.

The location of the side bearing on the truck bolster was determined by drawing a line from the center of gravity of the car to the center of the rail head and where this line intersected the truck bolster the side bearing was and should be located. To avoid a multiplicity of holes in the bolster casting this dimension is now arbitrarily set at two feet and one inch from the center line of the center plate to the center line of the side bearing.

These four side bearings per car, or four outer supports, together with the center plates effectively transfer the weight of the lading and car body to spring suspended truck and then to the rail head. This side bearing support cannot be a rigid one as the truck must freely swivel on the center plates to follow the rails.

Side bearings under even the best of conditions take a terrific pounding from the shifting loads and experience under service conditions has proven that these parts be made of steel having a Brinell Hardness factor of from 270 to 320. This hardness factor is no longer a debatable point to consider.

When determining the theoretical calculations, Static Loads, the body bolster is supported partly on one edge of the center plate, and partly on one side bearing. To produce this condition we apply a force of four-tenths of the total axle capacity at a point above the rail, Center of Gravity, outwardly and horizontally. This arbitrarily assumed force is that as specified by the Association of American Railroads for proportioning of side frames and bolsters. The total normal loading is discovered by taking moments about the assumed point of rotation, the edge of the center plate, about which the the car tends to rotate.

When the car is in motion over uneven tracks, or any other of the many reasons which causes a car to roll on and about its center plate the side bearing must transmit a portion of the shifting loads to the truck parts to avoid overturning of the car.

With the further and substantial permissive increase in the maximum gross weight on the rails, which is the weight of the freight car structure, plus the maximum weight of the lading, together with the higher train operating speeds, the problem of absorbing destructive side bearing forces is acute in nature. Failures of the present designs of side bearing housings is probable, caused by the uncontrolled longitudinal movement of the roller until it reaches the end portions of the housing destroying these ends and subsequent loss of the rollers. It is to the elimination of this problem that the features of the present invention are directed.

SUMMARY OF THE INVENTION

The present invention relates to a railway freight car truck side bearing housing in which rollers are confined within a housing mounted on the truck bolster and located thereon under the body bolster side bearing wear plate structure.

The primary object of the present invention is to provide an improved side bearing housing structure which will eliminate failure of the ends caused by the roller contacting these ends under operating conditions.

Another object of the invention is to provide a side bearing housing structure with a multiplicity of rolled steel parts easily and economically assembled with a single line of weld metal.

An additional object of the invention is to provide as a part of the base of the housing a limiting stop for operating movement of the roller within the housing, thereby eliminating end failures and loss of the roller.

A further object of the invention is the provision of relief of binding of the rollers at the zone of contact with the retaining walls of the side bearing housing structure.

A still further object of the invention is the provision of the ends of the housing above and beyond the distal ends of the base thus disposing of the problem of the roller contacting these ends and destroying them during service operations.

And further still provide an opening in the ends of the housing whereby dirt, debris, and other foreign matter may be easily discharged from the housing structure.

FIGURE DESCRIPTION

FIGURE 4 is a fragmentary view of the side bearing assembly of FIGURE 1 in side elevation taken along line 4—4 and showing a section of the body bolster wear plate construction in a position under operating load;

FIGURE 5 is a side elevation view of the roller control base showing the roller and a portion of the wear plate in phantom and in position under operating load positioned reverse to the position shown in FIGURE 4;

FIGURE 6 is a bottom view of the side bearing housing.

DETAIL DESCRIPTION

Figure 1:
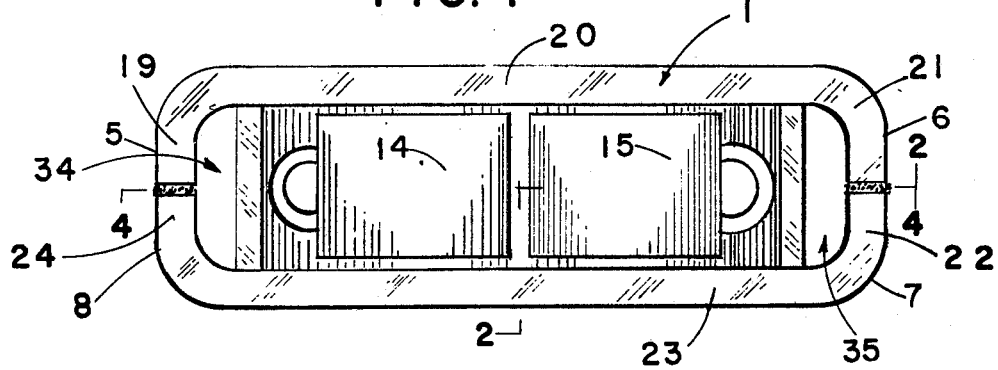
FIGURE 1 is a plan view of the side bearing assembly.
Figure 2:
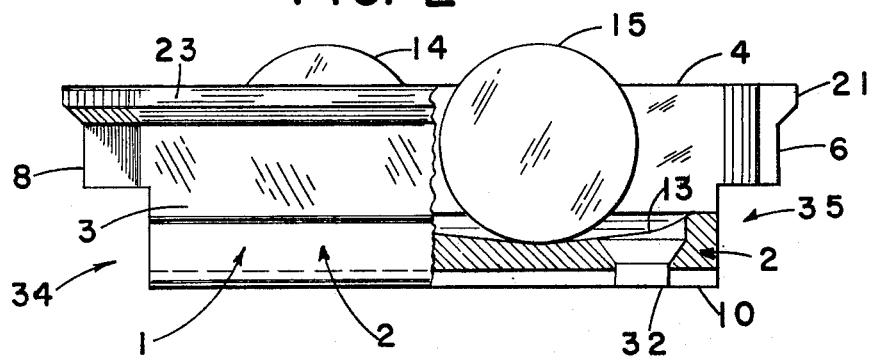
FIGURE 2 is a side elevation of the side bearing assembly having a portion of the housing structure removed as on lines 2—2 of FIGURE 1.

Referring now in detail to the drawings, in which like reference characters designate like parts, the improved side bearing housing structure is shown generally as at 1. A multi-part base element is generally shown as at 2. Extending upwardly from base element 2 are retaining walls 3 and 4 having portions forming end pieces 5, 6, 7 and 8 which extend beyond base element generally shown as at 2. Retaining walls 3 and 4 have inturned flanges 9 and 10 forming a lower base of base element generally shown as at 11, having arcuate portions 12 and 13 which are of greater height than permissible working clearance between the top of the rollers 14 and 15 and wear plate 16 shown in FIGURE 4. Wear plate 16 is attached by suitable means to filler 17 attached to the body bolster 18. Retaining walls 3 and 4, as well as end pieces 5, 6, 7, and 8 are conveniently formed and held together as by weld metal to create a continuous bulb angle having portions 19, 20, 21, 22, 23, and 24 to reenforce and tie together the housing structure against transverse forces.

Base elements 9, 10 and 11 are united by a single bead of weld metal 26, while the ends are united by weld metal 27 and 28.

Raised portion 25 is provided to permit of the rollers 14 and 15 returning to normal position by gravity when released of operating loads, as well as limiting the roller movement under operating load.

Figure 3:
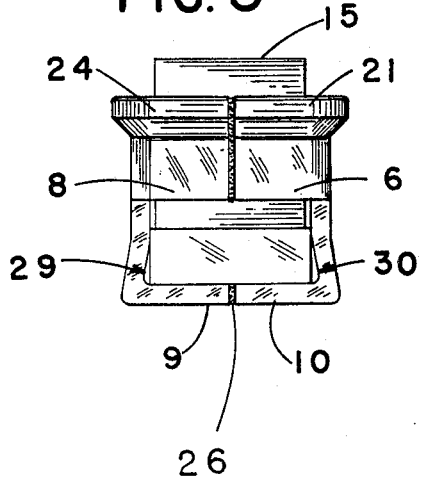
FIGURE 3 is an end elevation view of the structure of FIGURE 1.

Returning now to the lower base elements 9 and 10 which extend beyond the edges of base elements as at 11 to form in cooperation with an inwardly directed portion of retaining walls 3 and 4 an area of free movement generally shown as 29 and 30 shown in FIGURE 3, between the edge of rollers 14 and 15 to avoid binding of these rollers under operating conditions.

Holes 31 and 32 are spaced apart to match holes in the truck bolster 33 to receive securing rivets for the side bearing assembly. A partial sectional view of the truck bolster 33 is shown only to locate the mounting of the side bearing housing assembly on the railway freight car.

Openings 34 and 35 are provided to permit of easy discharge of foreign matter which may accumulate within the housing.

Having described my invention, I claim:

1. A side bearing housing structure consisting of a two-part first base element, and a second base element united to said first base element forming an unitary base structure; upstanding from said first base elements are retaining walls which confine a roller within said housing, said upstanding retaining walls having integral inturned flanges forming said first base element, the second base element have arcuate portions at the distal ends providing limiting means for longitudinal roller movement, and a line of weld metal uniting said first and second base elements.

2. A side bearing housing structure according to claim 1, wherein said retaining walls have portions forming end walls extending above and beyond the distal ends of said base elements forming a boundary for the opening at the housing ends, and weld metal uniting said end wall portions.

3. A side bearing housing structure according to claim 2, wherein said roller is confined within said housing and in cooperation with an associated body side bearing wear plate fixedly mounted on the body bolster and when under load restrains said roller from contacting said end walls.

4. A side bearing housing structure according to claim 2, wherein said upstanding retaining walls adjacent the upper surface of the base elements extend outwardly, upwardly and inwardly forming an area of free movement of said roller at the lower portion of the confining retaining walls.

References Cited

UNITED STATES PATENTS 2,124,958   7/1938   Severn _____ 308—226

MARTIN P. SCHWADRON, Primary Examiner

F. SUSKO, Assistant Examiner